United States Patent [19]
Pflaum

[11] Patent Number: 5,948,137
[45] Date of Patent: Sep. 7, 1999

[54] SCRAP METAL MEASURING AND WEIGHING PROCESS AND APPARATUS

[75] Inventor: Daniel A. Pflaum, Cincinnatti, Ohio

[73] Assignee: The David J. Joseph Company, Cincinnati, Ohio

[21] Appl. No.: 09/121,413

[22] Filed: Jul. 23, 1998

[51] Int. Cl.[6] .............................. C21B 11/00; C21B 11/10
[52] U.S. Cl. ........................... 75/10.12; 75/384; 75/386; 266/80; 266/91; 266/100
[58] Field of Search .................................. 75/10.12, 384, 75/386; 266/80, 90, 100, 91; 73/1.01

[56] References Cited

U.S. PATENT DOCUMENTS

| | | | |
|---|---|---|---|
| 4,582,992 | 4/1986 | Atwell et al. | 250/359.1 |
| 4,750,574 | 6/1988 | Williams | 177/25 |
| 4,882,927 | 11/1989 | Gould | 73/1.01 |
| 5,396,071 | 3/1995 | Atwell et al. | 250/358 |

*Primary Examiner*—Melvyn Andrews
*Assistant Examiner*—Tima McGuthry-Banks
*Attorney, Agent, or Firm*—Wood, Herron & Evans, LLP

[57] ABSTRACT

An on-line system for measuring the composition of scrap metal, including a loader with a load sensor having a motion compensator linked to a bulk material analyzer such as a prompt gamma-ray neutron activation analyzer. The grade of scrap used to prepare batches for a melt is controlled to provide a batch having desired properties and composition.

21 Claims, 5 Drawing Sheets

SCRAP METAL MEASURING AND WEIGHING PROCESS AND APPARATUS

FIELD OF THE INVENTION

The present invention relates to a system for measuring the composition of scrap metal. The system includes a computer model, a bulk material analyzer such as a prompt gamma neutron activation analyzer for optimizing the computer model, a loader with a load sensor having a motion compensator linked to the computer model. The various grades of scrap used in the preparation of a batch for a melt is controlled to provide a batch having desired chemical properties, physical properties and composition.

BACKGROUND OF THE INVENTION

Currently steel mills use large amounts of scrap steel obtained from various sources. The steel is purchased by grade and the price of the various grades of steel varies widely. The grades include briquettes, turnings, borings, municipal scrap, tire wire, tin can, tin plate, #2 bundles, #2 heavy melt, #1 heavy melt, plate and structural, shredded, busheling, #1 bundles, hot briquetted iron, direct reduced iron, pig iron, iron carbide, blast furnace iron reclaims, steel pot reclaims and steel mill home scrap. Other grades exist and within the grades the composition of the scrap may vary. The highest grade of steel scrap may be three times the cost of the lowest grade of scrap. Mills attempt to obtain batches of steel, known as a heat or a melt, by mixing these various grades to obtain the proper chemical composition and physical properties of the final product as well as to control processing variables such as yield, oxygen consumption and power consumption.

Steel mill operators currently rely upon visual inspection and the experience of the metallurgist to determine the composition of scrap fed into the melter of a steel mill. Based upon experience it is possible to roughly control the composition of the resulting melt. When using prior art methods of batch calculation it may be necessary to add lime, oxygen or high grade steel to bring a batch into conformance with a specification. At times it is not possible to bring a batch within the specification and the steel must then be diverted to another use. Typical mills operate with batch sizes ranging from 5–200 tonnes with annual melt capacity ranging up to 3 million tonnes. With this high throughput, even small errors in scrap selection may have substantial impact on the operating cost of the mill.

Bulk material analyzers are used to measure the elemental content of materials such as concrete used for construction purposes and coal for use in power generation. In bulk material analyzers, the material is transported through the material analyzer on a conveyor belt between at least one radiation source and at least one radiation detector. Typically, the radiation source includes a neutron source and the radiation detector includes one or more gamma-ray detectors. As neutrons bombard a material, characteristic quanta of energy are generated by stimulated emission. Stimulated emission is caused by the transfer of energy from the neutrons striking the atoms of the bulk material. The transferred energy drives the electrons of the material into an excited state and when the excited electrons revert to their base state quanta of energy, typically in the form of gamma-rays, are emitted. By analyzing the gamma spectra produced, the presence of different elements in the material may be measured. Based upon the relative intensities of the spectra, the ratio of the various elemental constituents may be ascertained. This measurement process is known as prompt gamma-ray neutron activation analysis (PGNAA).

Bulk material analyzers typically transport the material through the assembly on a conveyor belt or may drop the material through a chute. The conveyor runs between the radiation sources and the radiation detectors. Substantial shielding is included in the analyzer to prevent the escape of the neutrons and gamma-rays which are hazardous. The radiation detectors include scintilators which convert the gamma rays to light and photo-multiplier tubes which convert the light into electric signals which are sorted by their energy to generate gamma-spectra. A computer then analyzes the gamma-spectra to obtain the relative amount of each element in the sample.

Various bulk material analyzers, such as that disclosed by U.S. Pat. No. 4,582,992, "Self Contained, On-Line Real Time Bulk Material Analyzer" Inventor Atwell et al. (herein incorporated in its entirety by reference) and U.S. Pat. No. 5,396,071, "Modularized Assembly For Bulk Material Analyzer" Inventor Atwell et al. (herein incorporated in its entirety by reference) are known. U.S. Pat. No. 5,396,071, discloses a bulk material analyzer made up of individual modules that easily can be handled separately. Previously, the use of Bulk Material Analyzers has been limited to the measurement of sulfur and ash in coal fired electric plants and in cement plants to provide a consistent kiln feed.

Motion compensated scales have previously been used onboard ships to compensate for the movement caused by the pitch and roll of waves. A motion compensated scale typically includes one or more accelerometer and a computer which compares the output of the scale and the accelerometer to determine the actual weight of the object. One such motion compensated scale is set forth in U.S. Pat. No. 4,750,574, entitled "Accurate Weight Determination at Sea" inventor Williams (herein incorporated by reference in its entirety).

It has been known, at least in the area of stainless steels, to mix batches based upon the predetermined composition of scrap. Previously, the scrap composition was determined by standard sampling and spectrographic techniques.

SUMMARY OF THE INVENTION

The present invention provides a method and apparatus for providing scrap metal having a predetermined composition and melt characteristics. The present invention continuously controls the scrap metal added to a batch by using various grades of scrap metal and continuously monitoring the effect of the use of such scrap on the expected composition and processing costs of resulting steel. With this method, costly off specification batch compositions may be minimized while using the most cost effective scrap blends in the melt to obtain the target composition with a low cost liquid steel without the necessity to over-design the batch. The scrap produced by this process and apparatus may then be processed on site or transported to melting facilities for processing.

The objects and advantages of the present invention are achieved by loading predetermined weights of various scrap grades, measuring the ratio of the various components within the scrap and then calculating the constituents in the scrap and the impact of the use of that scrap on the characteristics of the steel.

The process and apparatus of one embodiment of the present invention typically includes a scale which may be included in an overhead loader, a bulk material analyzer and a computer system which optimizes the scrap blend to provide for a low cost high yield steel having the desired chemical composition. In a preferred embodiment the computer model includes a three stage processor including a linear processor for optimizing the chemistry of the batch, a business system to track the cost and availability of the scrap and a neural network which Outputs data to the linear processor, the business system and from the furnace in which the scrap is melted. The neural processor takes these inputs and based upon various factors including the expected conversion costs, melting capacity of the mill, sales capacity, scrap chemistry, scrap availability and scrap cost optimizes the batch to provide the lowest liquid steel cost for the mill. The neural processor may optionally output signals to a loader for automated loading of the scrap.

For scrap metal measuring and preparation, a target composition and the batch size is entered and based upon these constraints, the anticipated composition of the final product, as well as process variables including anticipated oxygen consumption, power consumption and yield are calculated. The calculation is performed using a processor and a historical database which is continuously updated. Certain grades of scrap are selected for use and the mass of that scrap is obtained, the scrap is then tested by bulk material analyzer such as Prompt Gamma Neutron Activation Analysis (PGNAA) and the percentages of various constituents are calculated. After the PGNAA step, the historical model is updated and the grade and mass of additional scrap required is calculated. With each scrap grade used, the batch of scrap is compared to the target composition and the need for additional scrap is calculated and added to the batch. By using the process and apparatus of the present invention, it is possible to obtain the characteristics desired while using lower cost grades of scrap. The process may include a neural network which allows for the continuous updating and optimization of the process.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there are described exemplary embodiments of the invention.

DETAILED DESCRIPTION

The on-line scrap measuring and weighing system of the present invention generally includes a loader having a built in scale for depositing scrap on a conveyor belt. The conveyor belt carries the scrap metal through a bulk material analyzer such as a prompt gamma neutron activation analyzer (PGNAA). The scrap is then dumped into a batch pile for loading into a melting furnace or shipment to consumers or may be directly loaded into a melting furnace. A suitable PGNAA is available from Gamma-Metrics Corporation of San Diego, Calif. The PGNAA measures the chemical composition of the scrap as it passes through the analyzer. The scrap is then transported to a bulk melter. The weight and composition information is transferred to a data processor which based upon continuously upgraded variables such as scrap grade composition, oxygen consumption of scrap grade, yield of scrap grade and power consumption of scrap grade calculates the weight and composition of additional scrap to be added to the batch. The data process or includes historical data relating to previous melts including the grades and amounts of scrap used and the resulting performance. A linear regression or neural model of the historical data is performed by the processor to determine the effect of each scrap grade and to continuously update the scrap selection variables. The processor also updates the scrap selection variables based upon the real-time measurements of the scrap composition.

Figure 1:
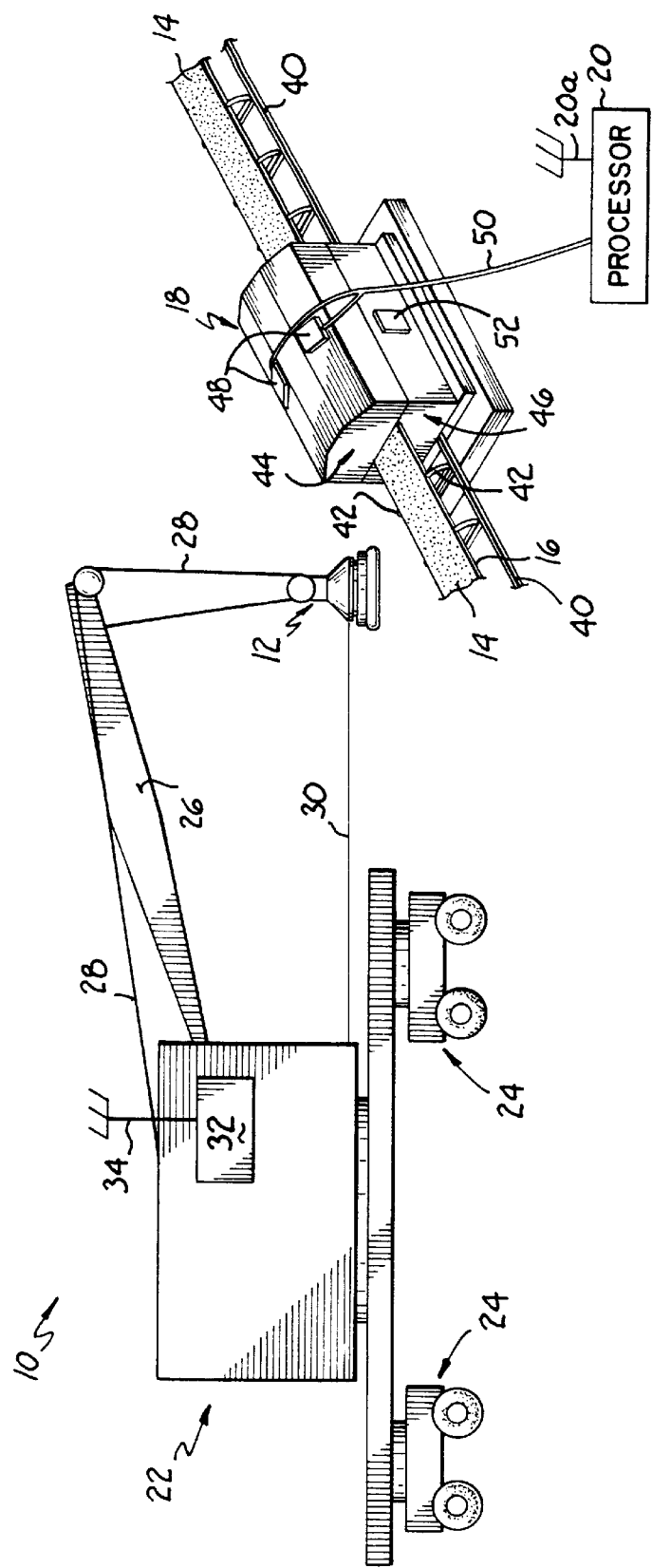
FIG. 1 is a schematic perspective view of the machinery used in on-line scrap metal measuring and preparation.

As can be seen in FIG. 1, a hydraulic crane such as a converted excavator, a front end loader or, as shown, a cable crane 10 having a hydraulic grapple, cable grapple or, as shown, a electromagnetic loader 12 including a motion compensated scale loads scrap steel 14 upon conveyor belt 16. The conveyor belt transports the scrap steel 14 through bulk material analyzer 18, then into a melter or a material receiving area (not shown) for later transport to a bulk melter. The bulk material analyzer 18 provides information to processor 20 reporting the composition of the scrap in real-time. The loader 10 includes cab 22, support 24, such as a railcar or truck bed and load arm 26. The load arm 26 of cable crane 10 supports the motion compensated loader 12 by load line 28 and may control loader 12 by a drag line 30. As discussed below, the loader 12 includes a scale with at least one accelerometer as well as an RF modem for communicating with processor 20. Crane 10 also includes a remote receiver 32, typically with an antenna 34 to receive data from processor 20 informing an operator of the amount and grade of scrap required. Alternatively, crane 10 may be remotely operated based on data provided by processor 20.

A predetermined amount of a grade of scrap steel 14 is loaded upon conveyor 16 for transport through bulk analyzer 18. The conveyor 16 is supported by conveyor support 40 and at or near the entrance to the bulk analyzer 18 a conveyor scale 42 may optionally be included to provide weight information to processor 20.

The bulk analyzer 18 includes an upper module 44 and a lower module 46. At least one gamma detector 48 may be included in the upper module 44 and at least one neutron source 52 is then located in the lower module 46. In use, neutron source 52, typically a radio-active isotope, emits neutrons which strike the atoms of the scrap steel. The neutrons transfer energy to the atoms which drive the electrons into an excited state. When the excited electrons return to their base state gamma rays are emitted. The gamma rays are received by gamma detectors 48 that typically include semiconductor type scintillators for converting the energy of the gamma rays into light. The light is then converted into electrical signals by photo-multiplier tubes. The electrical signals are then amplified and sorted to generate gamma spectra. The gamma spectra are then analyzed to determine the relative amount of each element present in the scrap.

The gamma-ray detectors 48 are connected by a link 50 such as cables or an RF modem to a data processor 20. The data processor uses the signals produced by the gamma-ray detectors to measure the elemental content of the bulk material being transported by the conveyor 16 through the bulk material analyzer assembly 18.

In a typical bulk material analyzer two neutron sources 52 are symmetrically disposed beneath the conveyor belt 16. The sources 52 and detectors 48 are typically collimated normal to conveyor. Two gamma ray detectors 48 are symmetrically disposed opposite the sources 52 with the conveyor positioned therebetween. The region between the sources 52 and the detectors 48 is referred to as the activation region.

The detectors 48 detect gamma rays that are secondarily emitted by materials in the activation region that are bombarded by neutron radiation from the sources 52. The detectors 48 produce signals in response to the detected gamma rays. These produced signals are characteristic of the elemental content of the bulk material in the activation region 28.

The processor 20 continuously processes the signals produced by the detectors 48 as well as the conveyor scale 42 and the load sensor 66 to measure the elemental content of the scrap 14 in the activation region. The processor 20 also maintains a weighted average of the elemental content of the scrap included in the batch.

Figure 2:
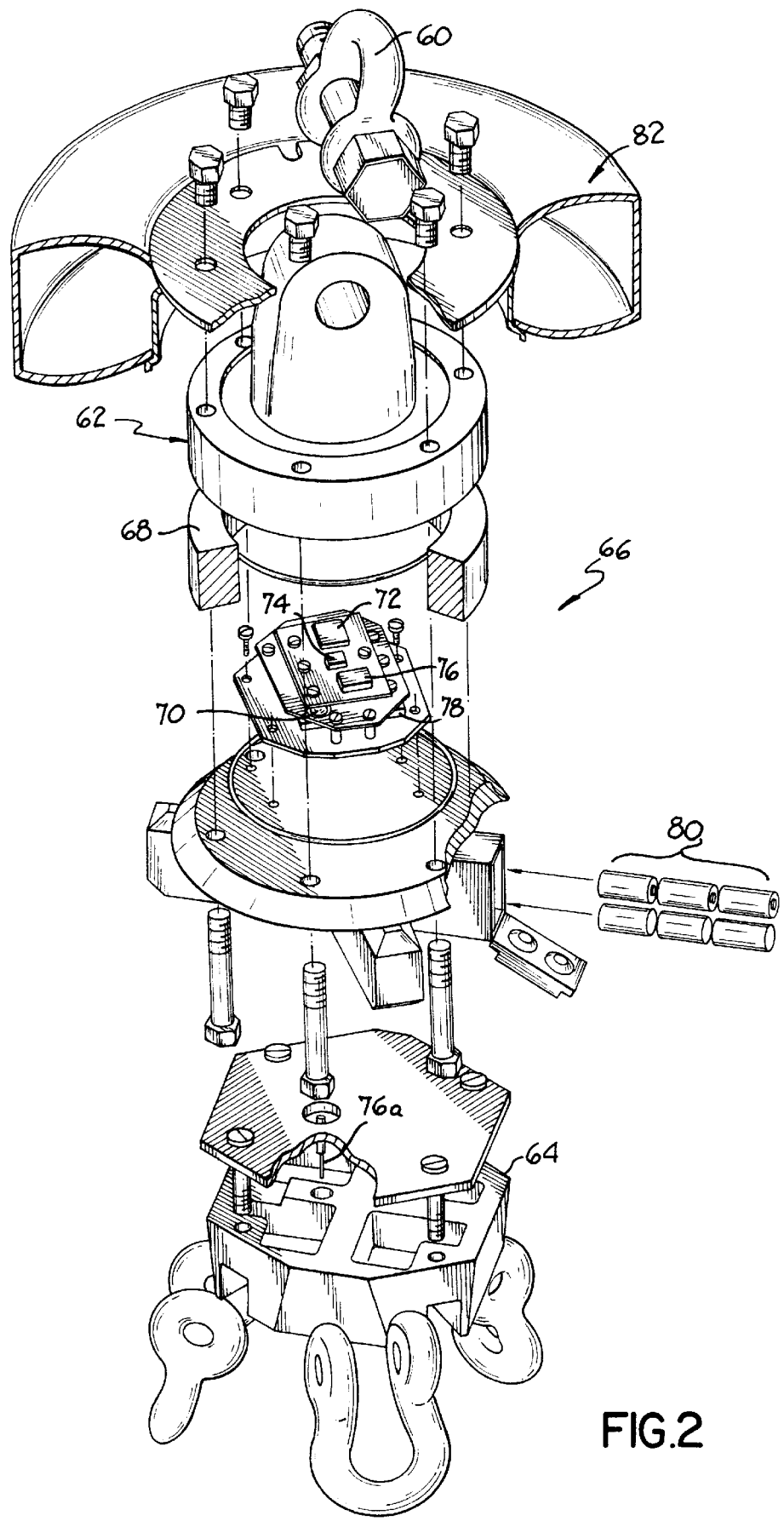
FIG. 2 is a schematic perspective view of a motion compensated load cell suitable for use in the present invention.
Figure 2A:
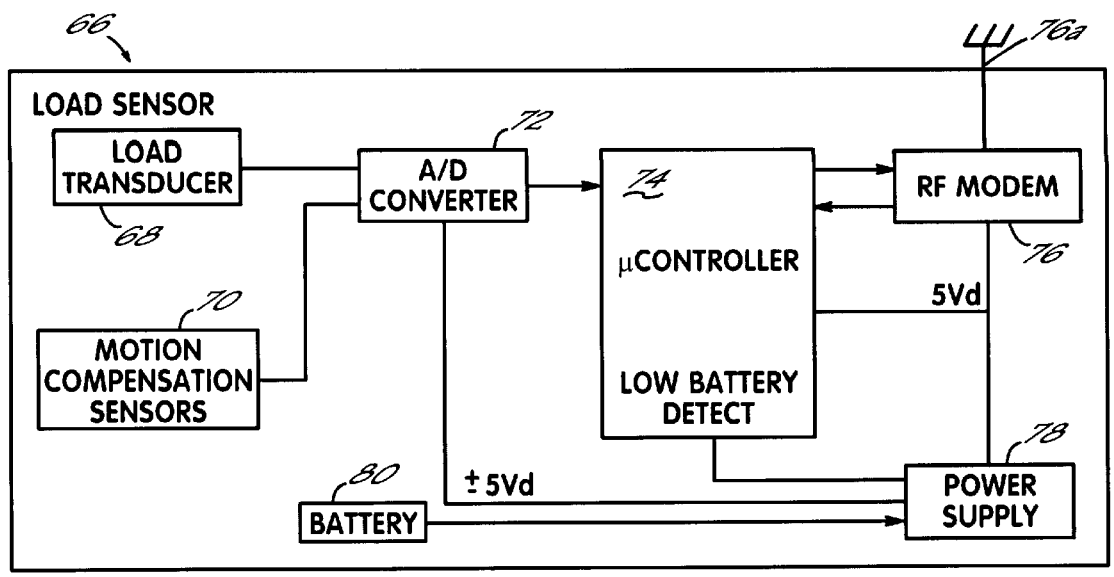
FIG. 2A is a functional block diagram of a load sensor suitable for use in the present invention.
Figure 3:
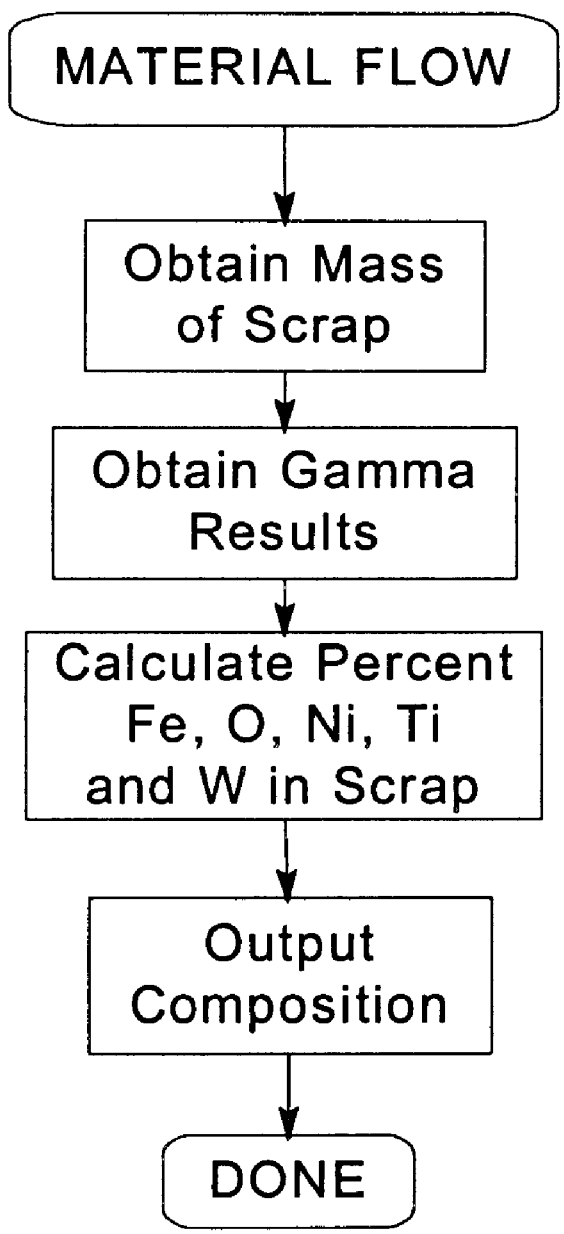
FIG. 3 is a material flow chart for the process of the invention.
Figure 4:
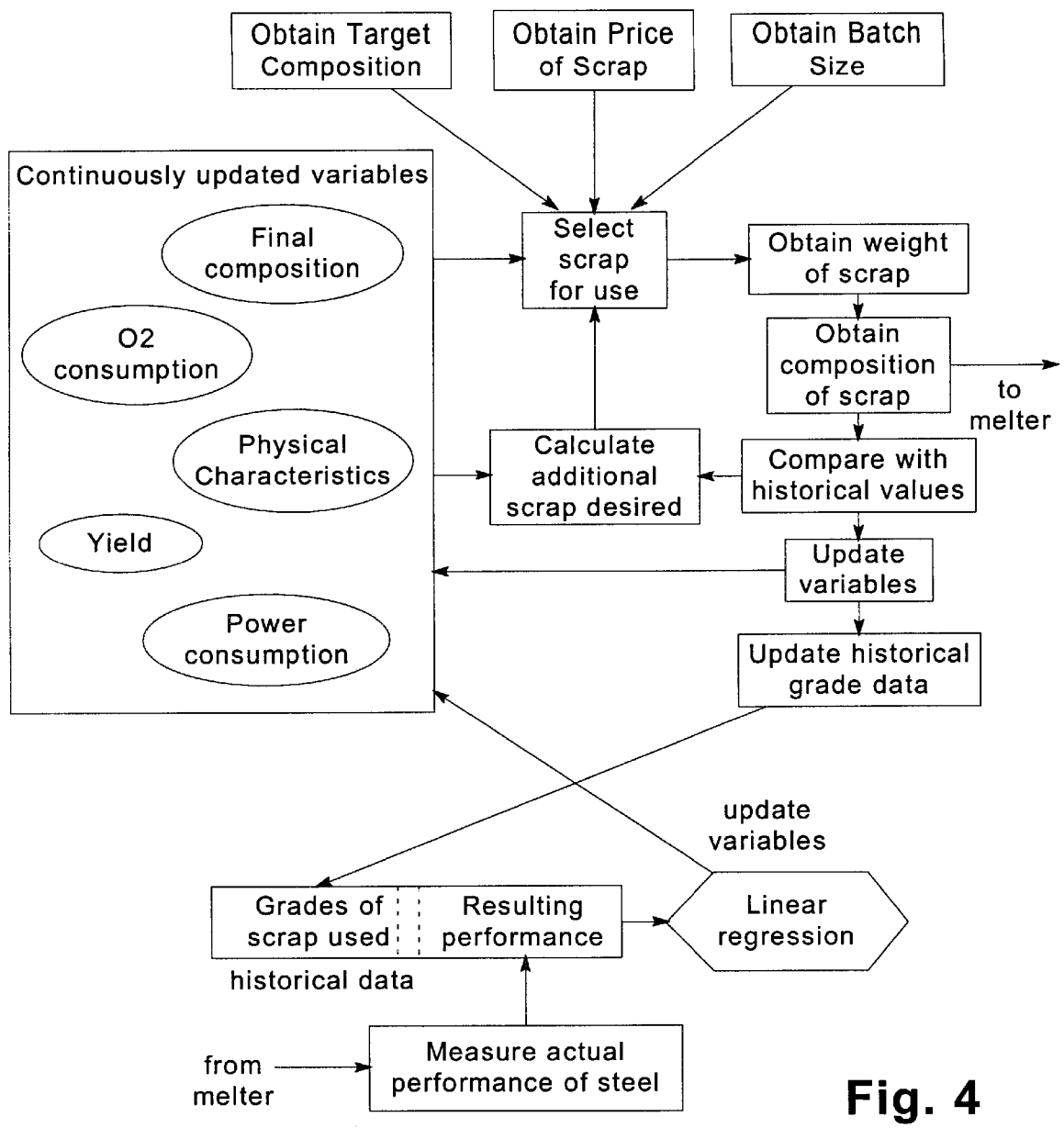
FIG. 4 is a flow chart showing the processing for on-line scrap metal measuring and preparation suitable for use in the present invention.

Referring now to FIGS. 2 and 2*a*, showing the over magnet motion compensated scale assembly of the electromagnetic loader 12. The scale assembly includes an upper coupling 60 for attachment to load line 28. Upper coupling 60 is attached to upper weight bearing element 62 which is joined to lower weight bearing element 64 having load sensor 66 positioned therebetween.

A load sensor suitable for use in the present invention is available from Measurement Systems International of Seattle, Wash. As shown in FIG. 2*a*, the load sensor 66 includes a load transducer 68, such as a piezoelectric electric load transducer and a motion compensator 70 such as an integrated accelerometer. The analog output of the load transducer 68 and motion compensator 70 are carried to an analog-digital convertor 72. The digital signal is then transferred to an embedded micro-controller 74 which correlates the load from transducer 68 and the instantaneous acceleration from motion compensator 70 to output a motion compensated weight value. The motion compensated weight value is then transferred to an RF modem 76 such as a spread spectrum or cellular modem and then to antenna 76*a* which transmits the compensated weight value to processor 20. The load sensor also includes a power source 80 such as D-cell batteries in series and a power supply 78 or alternatively the sensor may be hard wired to an external power source. Load sensor 66 is protected by a mechanical buffer 82 such as a rubber bumper.

The output from load sensor 66, conveyor scale 42 and gamma detectors 48 is transferred to processor 20. Based upon the input from load sensor 66, bulk analyzer 18 and conveyor scale 42 as well as various inputs such as target composition, price of scrap and desired batch size, processor 20 optimizes the use of scrap such as with a linear programing optimization. The linear algorithm assigns a value to the cost, availability, chemistry and conversion costs, such as yield, labor and power, and then minimizes the cost of the liquid steel. Various grades of scrap such as briquettes, turnings, borings, municipal scrap, tire wire, tin can, tin plate, #2 bundles, #2 heavy melt, #1 heavy melt, plate and structural, shredded, busheling, #1 bundles, hot briquetted iron, direct reduced iron, pig iron, iron carbide, blast furnace iron reclaims, steel pot reclaims and steel mill home scrap are available for use with the on-line scrap metal measuring and weighing system. Based upon historical data for process variables such as expected composition, yield, oxygen consumption and power consumption of the various grades of scrap, processor 20 selects among the various scrap grades in order to meet the target composition while optimizing use of the processing variables as well as the value of the scrap used.

The processor determines an amount of a given grade of scrap to be used and outputs a signal via antenna 20*a*. The signal is received by antenna 34 of receiver 32. The operator then accesses the selected grade of scrap and places the scrap on conveyor 14. The scrap is moved over conveyor scale 42 and through bulk material analyzer 18. The conveyor scale and the bulk material analyzer output weight and composition signals to processor 20. The processor then compares that composition with stored historical data for the expected effect of the scrap upon the final composition and the processing variables. Based upon the expected effect scrap composition, the processor then selects an additional amount of one of the available scrap grades for use. This process is repeated until the optimized scrap mixture and the proper batch size is obtained. The batch composition and scrap grades of the batch are then transferred to a historical database. After the scrap batch is melted and cast, the performance variables can be measured and added to the historical database. A linear regression of the historical data is then performed and the expected effect of the composition as well as the performance variables are updated. The processor 20 preferably includes a neural network which provides for the continuous improvement of the scrap metal measuring process.

Those skilled in the art will recognize that the embodiment illustrated in the Figures is not intended to limit the invention. Indeed, those skilled in the art will recognize that other alternative hardware environments may be used without departing from the scope of the invention. For instance, various scales may be used as well as any suitable bulk material analyzer.

We claim:

1. A process for obtaining a batch of scrap steel having desired characteristics, comprising the steps of:

selecting a first amount of scrap from a first scrap source;

weighing said first amount of scrap;

performing bulk material analysis of the first amount of scrap;

adding the first amount of scrap to a batch for use in a melter; and selecting a second amount of scrap from a second scrap source wherein said second scrap source is different from said first scrap source and combining said second amount of scrap with said first amount of scrap;

wherein said bulk material analysis of said first amount of scrap determines said second amount of scrap to establish said batch of steel having said desired characteristics.

2. The process of claim 1, further comprising the step of:

performing bulk material analysis of the second amount of scrap.

3. The process of claim 2, wherein an anticipated effect of the scrap selected upon at least process variables selected from the group consisting of final composition, oxygen consumption, power consumption and yield is anticipated based upon historical data.

4. The process of claim 3, further comprising the step of:

updating the process variables of the scrap based upon the bulk material analysis.

5. The process of claim 1, wherein the scrap bulk material analysis is a testing method selected from the group of physical sampling and spectrographic analysis; prompt gamma neutron activation analysis; and stored historical outcomes.

6. The process of claim 1, wherein the bulk material analysis is selected from the group of prompt gamma neutron activation analysis; physical sampling and spectrographic analysis; and stored historical outcomes.

7. An apparatus for obtaining a batch of scrap steel having desired characteristics, comprising:

a conveyor directed to a melter;

a loader adapted to select and deposit scrap on the conveyor; and a means to weigh said scrap selective by said loader; and a bulk material analyzer for determining the elemental composition of the scrap said apparatus further comprising a processor for calculating the need for additional scrap, selected from a plurality of available scrap grades, said processor capable of accessing at least one of:

stored values for the composition of the plurality of available scrap grades;

stored values for the expected impact of the use of the plurality of available scrap grades on process variables selected from the group consisting of oxygen consumption; power consumption, final composition and yield; and stored values for historical impact of the use of the plurality of available scrap grades on process variables selected from the group consisting of oxygen consumption, power consumption, final composition and yield.

8. The apparatus of claim 7, wherein the bulk material analyzer is a prompt gamma neutron activation analyzer.

9. The apparatus of claim 7, wherein the processor includes a neural network.

10. The apparatus of claim 7, wherein the processor updates said stored values based upon the bulk material analysis.

11. The apparatus of claim 7, further comprising:

a communications link between the processor and the loader for communication of an amount and grade of additional scrap needed from the processor to the loader.

12. The apparatus of claim 7, further comprising:

a motion compensated scale integrated with the loader.

13. An apparatus for obtaining a batch of material having desired characteristics, comprising:

a conveyor;

a loader including a motion compensated scale for depositing a known weight of material on the conveyor;

a prompt gamma neutron activation analyzer bulk material analyzer for determining the composition of the material;

a processor for calculating the amount and grade of additional material, selected from a plurality of available material grades, said processor capable of accessing:

stored values for the composition of the plurality of available material grades;

stored values for the expected impact of the use of the plurality of available material grades on process variables selected from the group consisting of oxygen consumption, power consumption, final composition and yield; and stored values for historical impact of the use of the plurality of available material grades on process variables such as oxygen consumption, power consumption, final composition and yield.

14. The apparatus of claim 13, wherein the processor includes a neural network.

15. The apparatus of claim 13, further comprising:

a communications link communicating the amount and grade of additional scrap needed from the processor to the loader.

16. A process for obtaining a batch of scrap steel having desired characteristics, comprising the steps of:

selecting and weighing a first amount of scrap from a first scrap source;

performing bulk material analysis of the first amount of scrap to thereby determine a need for at least one additional amount of scrap;

adding the first amount of scrap to a batch for use in a melter; and communicating the need for at least one additional amount of scrap, based upon the bulk material analysis of the foregoing scrap wherein said additional amount of scrap is selected from a second scrap source.

17. The process of claim 16, further comprising the step of:

performing material analysis of the additional amounts of scrap by one or more of physical sampling and spectrographic analysis; prompt gamma neutron activation analysis; or accessing stored historical outcomes.

18. The process of claim 16, wherein the first amount of scrap and the addition amounts of scrap are selected from more than one grade of scrap, and further comprising the steps of:

performing bulk material analysis of the additional amounts of scrap;

storing the composition of each grade of scrap and selecting subsequent scrap based upon the stored composition.

19. The process of claim 18, wherein the bulk material analysis is prompt gamma neutron activation analysis.

20. The process of claim 18, wherein an anticipated effect of the scrap selected upon one or more process variables selected from the group consisting of final composition, oxygen consumption, power consumption and yield is anticipated based upon historical data.

21. The process of claim 20, further comprising the step of:

updating the process variables of the scrap based upon the bulk material analysis.

* * * * *